United States Patent [19]

Edenhofer et al.

[11] 3,862,158

[45] Jan. 21, 1975

[54] PIPERIDINE ETHERS

[75] Inventors: Albrecht Edenhofer, Riehen; Hans Spiegelberg, Basel, both of Switzerland

[73] Assignee: Hoffmann-La Roche Inc., Nutley, N.J.

[22] Filed: Oct. 3, 1973

[21] Appl. No.: 403,135

Related U.S. Application Data

[62] Division of Ser. No. 237,539, March 23, 1972, Pat. No. 3,790,583, which is a division of Ser. No. 882,298, Dec. 4, 1969, Pat. No. 3,674,799.

[30] Foreign Application Priority Data

Dec. 24, 1968 Switzerland........................ 19268/68

[52] U.S. Cl... 260/293.77, 260/293.73, 260/293.79, 260/293.8, 260/293.82, 260/293.83
[51] Int. Cl............................................ C07d 29/30
[58] Field of Search..... 260/293.73, 293.77, 293.79, 260/293.8, 293.82, 293.83

[56] References Cited
UNITED STATES PATENTS 3,816,434   6/1974   Edenhofer et al. .............. 260/293.8

*Primary Examiner*—Henry R. Jiles
*Assistant Examiner*—S. D. Winters
*Attorney, Agent, or Firm*—Samuel L. Welt; Bernard S. Leon; William G. Isgro

[57] ABSTRACT

Substituted [3-(4-phenyl-1-hydropyridyl)-propoxy or propylthio]anilines prepared, inter alia, by reacting the correspondingly substituted propoxy or propylthio anilines and N-phenyl-hydropyridines, are described. The end products, i.e., the substituted [3-(4-phenyl-1-hydropyridyl)propoxy or propylthio]anilines are useful as antiphlogistic, antiallergic, antitussive and analgesic agents.

5 Claims, No Drawings

PIPERIDINE ETHERS

CROSS REFERENCE TO RELATED APPLICATIONS

This is a division of application Ser. No. 237,539 filed Mar. 23, 1972 and now U.S. Pat. No. 3,790,583 which in turn is a division of U.S. Pat. application Ser. No. 882,298, filed Dec. 4, 1969 now U.S. Pat. No. 3,674,799 issued Jul. 4, 1972.

BRIEF SUMMARY OF THE INVENTION

The invention relates to aromatic ethers of the formula

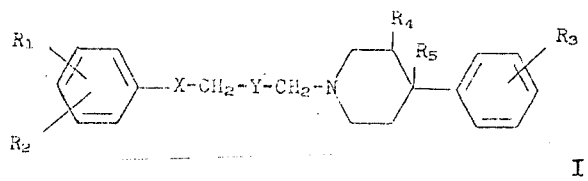

wherein $R_1$ is hydrogen, amino, mono-(lower alkyl)amino, lower alkanoylamido, aroylamido, N-(lower alkyl) lower alkanoylamido, lower alkylsulfonylamido, carbamoyl or urcido; $R_2$ is hydrogen, halogen, lower alkyl or lower alkoxy; $R_3$ is halogen; $R_4$ is hydrogen; $R_5$ is hydrogen or hydroxy; $R_4$ together with $R_5$ is a carbon to carbon bond; X is oxy or thio; and Y is methylene, hydroxymethylene, lower alkanoyloxymethylene, lower alkylsulfonyloxymethylene, arylsulfonyloxymethylene or carbonyl, and their pharmaceutically acceptable acid addition salts.

In another aspect, the invention relates to novel intermediates, for example, the compounds of the formula

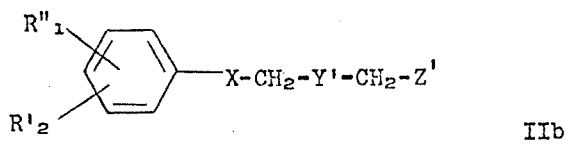

wherein $R''_1$ is lower alkanoylamido of 3-7 carbon atoms, carbamoyl or ureido; $R'_2$ is hydrogen or halogen; X is oxy or thio; Y' is methylene or hydroxymethylene; and Z' is halogen or taken together with Y' and the end methylene group is

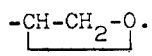

DETAILED DESCRIPTION OF THE INVENTION

The invention relates to aromatic ethers of the formula

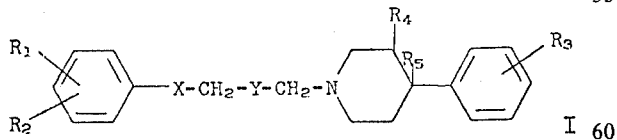

wherein $R_1$ is hydrogen, amino, mono-(lower alkyl) amino, lower alkanoylamido, aroylamido, N-(lower alkyl) lower alkanoylamido, lower alkylsulfonylamido, carbamoyl or ureido; $R_2$ is hydrogen, halogen, lower alkyl or lower alkoxy; $R_3$ is halogen; $R_4$ is hydrogen; $R_5$ is hydrogen or hydroxy; $R_4$ together with $R_5$ is a carbon to carbon bond; X is oxy or thio; and Y is methylene, hydroxymethylene, lower alkanoyloxymethylene, lower alkylsulfonyloxymethylene, arylsulfonyloxymethylene or carbonyl, and their pharmaceutically acceptable acid addition salts.

As used herein, the term "lower alkyl" denotes straight or branched chain lower alkyl of 1 to 6 carbon atoms, for example, methyl, ethyl, isopropyl, butyl, pentyl and the like. The term "lower alkoxy" denotes lower alkyl ether groups in which the lower alkyl is as described above, for example, methoxy, ethoxy, isopropoxy and the like. The term "halogen" denotes chlorine, bromine, fluorine and iodine. Of the halogen atoms, fluorine and chlorine are preferred.

The amino group can be substituted by lower alkyl of 1 to 6 carbon atoms, such as, for example, methyl-, ethyl-, propyl-, butyl- or pentyl-amino and the like. The term "lower alkanoyl" denotes a residue of a carboxylic acid of 1 to 6 carbon atoms, for example, formyl, acetyl, propionyl or the like; acetyl is preferred. The term "aroyl" denotes a residue of a halogen substituted aromatic carboxylic acid with up to 11 carbon atoms, for example, p-chlorobenzoyl and the like. The lower alkylsulfonyl residues are derived from sulfuric acid substituted by lower alkyl, for example, methylsulfonyl, ethylsulfonyl and the like; methylsulfonyl is preferred. The term "aryl" denotes phenyl or phenyl bearing a lower alkyl of 1-4 carbon atoms; of these, p-tolyl is preferred.

The carbamoyl group can be mono- or di-substituted by lower alkyl of 1 to 6 carbon atoms or monosubstituted by phenyl or halo-substituted phenyl, such as for example, the N-methylcarbamoyl, N,N-dimethylcarbamoyl, N-isopropylcarbamoyl, N-isobutylcarbamoyl, N-tert. butylcarbamoyl, N-phenylcarbamoyl and the like.

The ureido group can also be substituted by lower alkyl of 1 to 6 carbon atoms, for example, methylureido, isopropylureido and the like.

Representative examples of the compounds of formula I are:

rac-p{3-[4-(p-fluoro-phenyl)-3,6-dihydro-1(2H)-pyridyl]-2-hydroxy-propoxy}-aniline:

rac-o{3-[4-(p-fluoro-phenyl)-3,6-dihydro-1-(2H)-pyridyl]-2-hydroxy-propoxy}-N-methylaniline;

rac-4'-{3-[4-(p-chloro-phenyl)-3,6-dihydro-1(2H)-pyridyl]-2-hydroxy-propoxy}-acetanilide;

rac-4'-{3-[4-(p-fluoro-phenyl)-3,6-dihydro-1(2H)-pyridyl]-2-hydroxy-propoxy}-acetanilide;

rac-4'-[{3-[4-(p-fluoro-phenyl)-3,6-dihydro-1(2H)-pyridyl]-2-hydroxy-propyl}-thio]-acetanilide; rac-4'-{3-[4-(p-fluoro-phenyl)-3,6-dihydro-1(2H)-pyridyl]-2-hydroxy-propoxy}-propionanilide rac-4'-{3-[4-(p-fluoro-phenyl)-3,6-dihydro-1(2H)-pyridyl]-2-hydroxy-propoxy}-isobutyranilide; rac-4'-{3-[4-(p-fluoro-phenyl)-3,6-dihydro-1(2H)-pyridyl]-2-hydroxy-propoxy}-methanesulfonanilide;

rac-4'-[{3-[4-(p-fluoro-phenyl)-3,6-dihydro-1(2H)-pyridyl]-2-hydroxy-propyl}-thio]-methanesulfonanilide;

rac-2'-{3-[4-(p-fluoro-phenyl)-3,6-dihydro-1(2H)-pyridyl]-2-hydroxy-propoxy}-N-methyl-acetanilide;

rac-o-{3-[4-(p-fluoro-phenyl)-3,6-dihydro-1(2H)-pyridyl]-2-hydroxy-propoxy}-benzamide;

rac-p-[{3-[4-(p-fluoro-phenyl)-3,6-dihydro-1-(2H)-pyridyl]-2-hydroxy-propoxy}-phenyl]-urea;

rac-4′-{3-[4-(p-chloro-phenyl)-4-hydroxy-piperidino]-2-hydroxy-propoxy}-acetanilide;

rac-4′-{3-[4-(p-fluoro-phenyl)-3,6-dihydro-1(2H)-pyridyl]-2-acetoxy-propoxy}-propionanilide;

4′{3-[4-(p-fluoro-phenyl)-3,6-dihydro-1(2H)-pyridyl]-propoxy}-acetanilide;

4′-[{3-[4-(p-fluoro-phenyl)-3,6-dihydro-1(2H)-pyridyl[-propyl}-thio]-methanesulfonanilide;

rac-p-[{3-[4-(p-fluoro-phenyl)-3,6-dihydro-1(2H)-pyridyl]-2-hydroxy-propyl}-thio]-anisole, and the like.

The compounds of the invention can be prepared by the following processes:

a. A compound of the formula

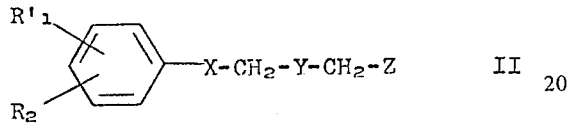 II wherein $R_2$, X and Y are as previously described; $R′_1$ is hydrogen, nitro, lower alkanoylamido, N-(lower alkyl) lower alkanoylamido, aroylamido, carbamoyl or ureido; Z is halogen, lower alkylsulfonyloxy, arylsulfonyloxy, or when taken together with Y and the end methylene group is

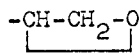

is reacted with a compound of the formula

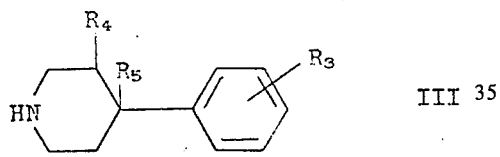 III wherein $R_3$, $R_4$ and $R_5$ are as previously described; or b. A compound of the formula

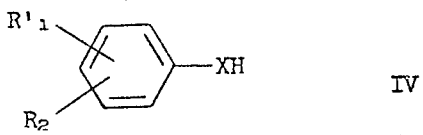 IV wherein $R′_1$, $R_2$ and X are as previously described is reacted with a compound of the formula

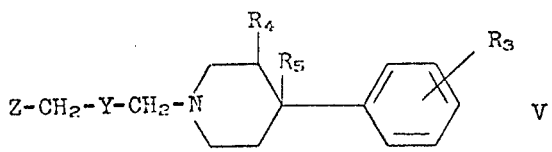 V wherein $R_3$, $R_4$, $R_5$, X and Z are as previously described.

The product obtained in a given case can be further modified. For example, a nitro group is reduced; a 3,6-dihydro-1(2H)-pyridyl residue is hydrogenated, if desired; an acylamido group is saponified, if desired; an amino group is acylated or alkylated, if desired; a carbonyl group is reduced to the hydroxymethylene or methylene group, if desired; a hydroxymethylene group is esterified, if desired; and the compound of formula I thus obtained is optionally converted into a pharmaceutically acceptable acid addition salt.

The starting compounds of formula II in part are new compounds. 4′-(2,3-Epoxy-propoxy)-propionanilide, for example, is a new compound which, for instance, can be prepared by reacting excess epihalohydrin with p-hydroxy-propionanilide in the presence of an excess of aqueous caustic alkali, preferably caustic soda, conveniently at room temperature.

The corresponding 4′-[2-hydroxy-3-halo-propoxy]-propionanilide can, for example, by prepared by reacting an acid addition of salt of a tertiary base such as pyridine hydrochloride or triethylamine hydrochloride, with the epoxide named hereinbefore in a protic solvent such as a lower alkanol, for example methanol and the like, preferably at a temperature in the range of between about room temperature and the boiling point of the reaction mixture. The corresponding 4′-[2-hydroxy-3-tosyloxy-propoxy]-propionanilide can be prepared from the epoxide and p-toluenesulfonic acid as described hereinbefore. The other compounds of formula II can be prepared in an analogous manner. The new compounds are characterized by the formula

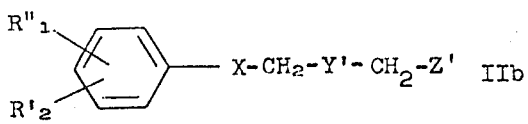 IIb wherein $R″_1$ is lower alkanoylamide of 3–7 carbon atoms, carbamoyl or ureido; $R′_2$ is hydrogen or halogen; X is oxy or thio; Y′ is methylene or hydroxymethylene; and Z′ is halogen or taken together with Y′ and the end methylene group is

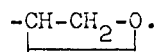

The reactants of formula III, for example, p-fluorophenyl-1,2,3,6-tetrahydropyridine and the like, are generally known compounds or can be prepared in accordance with known procedures.

The reaction of the compounds of formula II with compounds of formula III is advantageously carried out so that the corresponding epoxide of a compound of formula II is reacted with the compound of formula III in a polar organic solvent, for example, in a lower alkanol, such as methanol and the like, or in a cyclic ether as dioxane, at a temperature in the range of between about room temperature and the boiling temperature of the reaction mixture, or so that the corresponding halo or tosyloxy compound of formula II is reacted with a compound of formula III in the presence of potassium or sodium carbonate in a lower alkanol such as ethanol or isopropanol, or in dimethylformamide or tetrahydrofuran at a temperature in the range of between about room temperature and the boiling temperature of the reaction mixture.

The starting compounds of formula IV, for example p-hydroxy-propionanilide, are generally known compounds or can be prepared in accordance with known procedures.

The reactants of formula V are known compounds.

If an acid binding agent, e.g., an aqueous or an alkanolic alkali metal hydroxide solution, particularly an aqueous potassium hydroxide solution or an ethanolic potassium hydroxide solution, is allowed to act on a halohydrine compound, preferably at room temperature, a corresponding epoxide of formula V is obtained.

The corresponding tosyloxy compound of formula V can be prepared by reacting the epoxide obtained with p-toluene-sulfonic acid. The other compounds of formula V can be prepared in an analogous manner.

The reaction of the compounds of formula IV with halo or tosyl compounds of formula V is advantageously carried out in such a way that the two reaction components are allowed to react with each other in the presence of an alkali alkanolate, conveniently at the boiling temperature of the reaction mixture.

If an epoxide of a compound of formula V is utilized, the reaction with a compound IV is preferably carried out in the presence of a catalytic amount of an organic or inorganic base, for example pyridine or potassium hydroxide, in a polar solvent, preferably a lower alkanol such as ethanol, or in a cyclic ether such as dioxane, conveniently at the boiling temperature of the reaction mixture.

The compounds of formula I with a 3,6-dihydro-1-(2H)-pyridyl residue can be hydrogenated. In this case, the pyridyl compound is converted into the corresponding piperidine compound in the presence of a noble metal catalyst, preferably in an organic solvent, for example, an alkanol such as methanol or ethanol. The hydrogenation can be carried out under normal or super atmospheric pressure, at room temperature or at a temperature in the range of between about room temperature and the boiling point of the reaction mixture.

The compounds obtained which contain a nitro group are reduced in a known manner, conveniently in a chemical or catalytic manner, for example, with tin/hydrochloric acid or with hydrogen in the presence of a noble metal catalyst. The hydrogenation is preferably carried out under normal pressure at room temperature in the presence of an alkanol, preferably in ethanol, in the presence of palladium/charcoal or platinum oxide as the catalyst.

The compounds of formula I wherein $R_1$ is an acylamido group can be saponified in a known manner with acidic or alkaline agents, for example, dilute aqueous alkali or aqueous acid. The saponification is advantageously carried out with a 20 percent aqueous hydrochloric acid at elevated temperature, preferably at the boiling temperature of the reaction mixture.

The compounds of formula I wherein $R_1$ is an amino group can be N-acylated in a known manner, for example, by treatment with an acid halide or acid anhydride. When employing alkanoyl, aroyl or alkylsulfonyl halides, the N-acylation is expediently carried out in the presence of a base, for example, pyridine or triethylamine, in the cold, preferably at a temperature in the range of about 0° to about 5°C. When employing alkanoyl or aroyl anhydrides, it can be carried out in the presence of a protic solvent, for example, a lower alkanol, such as methanol or ethanol, as well as in the presence of dilute acetic acid, preferably at room temperature.

The compounds of formula I wherein $R_1$ is an amino or acylamido group can be N-alkylated in a known manner, for example, with alkyl halides. Under such circumstances, conveniently the corresponding compound is immediately reacted with the alkyl halide in the presence of sodium hydride at a temperature in the range of between about 0° and room temperature.

The compounds of formula I wherein $R_1$ is an amino group can be methylated with the aid of formaldehyde/formic acid. More particularly, the amine is dissolved in 90 percent formic acid and treated with 40 percent formaldehyde. Before working up, the reaction mixture is conveniently heated further on the steam bath for an extended period of time after cessation of the evolution of carbon dioxide.

The compounds of formula I wherein Y is a carbonyl group can be reduced to compounds of formula I wherein Y is a hydroxymethylene group in a known manner, for example, by treatment with a complex metal hydride, preferably a complex borohydride. The reduction is expediently carried out with the aid of an alkali metal borohydride, preferably sodium borohydride, in a lower alkanol such as ethanol, at a temperature in the range of between about room temperature and the boiling temperature of the reaction mixture.

The compounds of formula I wherein Y is a hydroxymethylene group can be acylated in a known manner, for example, by reacting with an alkanoyl-, alkylsulfonyl- or an arylsulfonyl halide conveniently in the presence of a base such as pyridine or triethylamine or by reacting with corresponding anhydride, for example, acetic anhydride. The acylation can be carried out at a temperature in the range of between about room temperature and the boiling temperature of the reaction mixture, also in the presence of aprotic polar solvents such as dimethylsulfoxide. An amine group which may be present will also acylate under these conditions.

The compounds of formula I wherein Y is hydroxymethylene and/or $R_5$ is hydroxy are obtained as racemates. These can be separated into the optical antipodes in a known manner, for example, with the aid of optically active acids such as tartaric acid. The separation of the antipodes can also be carried out on the intermediate compounds when $R_1$ is nitro.

The compounds of formula I form acid addition salts with inorganic or organic acids. Exemplary of these are: salts with hydrohalic acids such as hydrochloric or hydrobromic acid, salts with mineral acids, for example with sulfuric acid, or also salts with organic acids, for example, with benzoic acid, acetic acid, tartaric acid, citric acid, lactic acid and the like.

The aromatic ethers of formula I prepared in accordance with the invention have antiphlogistic, antiallergic, antitussive and analgesic activity and are useful as antiphlogistic antiallergic, antitussive and analgesic agents. Compounds of formula I wherein $R_1$ is acylamino; $R_2$ is hydrogen; $R_3$ is fluorine or chloride; X is oxy or thio and Y is hydroxymethylene are preferred compounds. Rac-4'-{3-[4-(p-fluoro-phenyl)-3,6-dihydro-1(2H)-pyridyl]-2-hydroxy-propoxy}-isobutyranilide exhibits particularly strong activity. The toxicity of this compound is low. In rats, on oral administration, the lethal dosage [$LD_{50}$] is about 750 mg/kg. The anti-inflammatory activity has been demonstrated in rats at a dosage of 30 mg. p.o./kg.

The aromatic ethers of formula I can accordingly be used, for example, for combatting rheumatic diseases. For such uses, up to about 100 mg. per day of the compounds of formula I, as exemplified by rac-4'-{3-[4-(p-fluoro-phenyl)-3,6-dihydro-1(2H)-pyridyl]-2-hydroxy-propoxy}-isobutyranilide can be administered in divided doses.

The antitussive, analgesic and antiallergic activities can also be demonstrated in animals in accordance with standard procedures. Rac-4'-{3-[4-(p-fluoro-phenyl)-3,6-dihydro-1(2H)-pyridyl]-2-hydroxy-propoxy}-isobutyranilide, when administered orally to Guinea pigs at a dose of 10 mg/kg., exhibits antitussive activity.

Rac-4'-{3-[4-(p-fluoro-phenyl)-3,6-dihydro-1(2H)-pyridyl]-2-hydroxy-propoxy}-propionanilide, when administered orally to rats at a dose of 30 mg/kg., exhibits analgesic activity.

4'-{3-[4-(p-fluoro-phenyl)-3,6-dihydro-1(2H)-pyridyl]-propoxy }-acetanilide, when administered orally to Guinea pigs at a dose of 3 mg/kg., exhibits antiallergic acitvity.

The compounds of formula I can be used in the form of pharmaceutical preparations which contain them or their salts in admixture with an organic or inorganic pharmaceutically inert carrier suitable for enteral or parenteral application such as, for example, water, gelatin, gum arabic, lactose, starches, vegetable oils, polyalkyleneglycols, and the like. The pharmaceutical preparations can be in solid form, for example, tablets, dragees, suppositories or capsules, or in liquid form, for example, as solutions, suspensions or emulsions. The preparation may be sterilized and/or contain additives, such as preservatives, stabilizers, wetting or emulsifying agents, or salts for varying the osmotic pressure. The pharmaceutical preparations can also contain additional therapeutically active substances.

EXAMPLE 1

Preparation of rac-2'-{3-[4-(p-fluoro-phenyl)-3,6-dihydro-1(2H)-pyridyl]-2-hydroxy-propoxy}-acetanilide 4.1 g. of 2'-(2,3-epoxy-propoxy)-acetanilide and 3.8 g. of 4-(p-fluoro-phenyl)-1,2,3,6-tetrahydropyridine are heated under reflux conditions in 30 ml. of ethanol for 1 hour. The solvent is removed by evaporation under reduced pressure. The residual oily rac-2'-{3-[4-(p-fluoro-phenyl)-3,6-dihydro-1(2H)-pyridyl]-2-hydroxy-propoxy}-acetanilide is dissolved in ethyl acetate and treated with alcoholic hydrochloric acid to congo-acidic reaction. The hydrochloride salt of rac.-2'-{3-[4-(p-fluoro-phenyl)-3,6-dihydro-1(2H)-pyridyl]-2-hydroxy-propoxy }-acetanilide melts at 237°–238°C. after recrystallization from ethanol.

In analogous manner there is obtained:

By the reaction of 4'-(2,3-epoxy-propoxy)-acetanilide and 4-(p-chloro-phenyl)-1,2,3,6-tetrahydropyridine: rac-4'-{3-[4-(p-chloro-phenyl)-3,6-dihydro-1(2H)-pyridyl]-2-hydroxy-propoxy}-acetanilide, having a melting point of 185°–186°C. (from ethanol);

By the reaction of 2'-(2,3-epoxy-propoxy)-acetanilide and 4-(p-chloro-phenyl)-1,2,3,6-tetrahydropyridine: rac-2'-{3-[4-(p-chloro-phenyl)-3,6-dihydro-1(2H)-pyridyl]-2-hydroxy-propoxy}-acetanilide hydrochloride, having a melting point of 136°–137°C. (dec.) (from methanol-/ethyl acetate);

By the reaction of 2'-(2,3-epoxy-propoxy)-acetanilide and 4-(p-fluoro-phenyl)-4-hydroxypiperidine: rac-2'-{3-[4-(p-fluoro-phenyl)-4-hydroxy-piperidino]-2-hydroxy-propoxy}-acetanilide hydrochloride, having a melting point of 219°–220°C. (from ethanol/ether);

By the reaction of 2'-(2,3-epoxy-propoxy)-acetanilide and 4-(p-fluoro-phenyl)-1,2,3,6-tetrahydropyridine: rac-2'-{3-[4-(p-fluoro-phenyl)-3,6-dihydro-1(2H)-pyridyl]-2-hydroxy-propoxy}-acetanilide hydrochloride, having a melting point of 201°–202°C. (from ethanol/ethyl acetate);

By the reaction of 2'-(2,3-epoxy-propoxy)-acetanilide and 4-(p-fluoro-phenyl)-piperidine: rac-2'-{3-[4-(p-fluoro-phenyl)-piperidino]-hydroxy-propoxy}-acetanilide hydrochloride, having a melting point of 133°–135°C. (from ethanol/ethyl acetate);

By the reaction of 5'-chloro-2'-(2,3-epoxy-propoxy)-acetanilide and 4-(p-fluoro-phenyl)-1,2,3,6-tetrahydropyridine: rac-5'-chloro-2'-{3-[4-(p-fluorophenyl)-3,6-dihydro-1(2H)-pyridyl]-2-hydroxypropoxy}-acetanilide hydrochloride, having a melting point of 175°–178°C. (from methanol/ethyl acetate).

The 5'-chloro-2'-(2,3-epoxy-propoxy)-acetanilide employed above can be prepared as follows:

37.1 g. of 4-chloro-2-acetamino-phenol are introduced into a solution containing 9.6 g. of sodium hydroxide in 200 ml. of water and, following the addition of 92.5 g. of epichlorohydrin, the mixture is intensively stirred at room temperature for 20 hours. After washing with water, the precipitate which forms is recrystalized from ethyl acetate/petroleum ether to yield 5'-chloro-2'-(2,3-epoxy-propoxy)-acetanilide, which melts at 87°–88°C.

By the reaction of 3'-(2,3-epoxy-propoxy)-acetanilide and 4-(p-fluoro-phenyl)-1,2,3,6-tetrahydropyridine: rac-3'-{3-[4-(p-fluoro-phenyl)-3,6-dihydro-1(2H)-pyridyl]-2-hydroxy-propoxy}-acetanilide hydrochloride, having a melting point of about 125°C. (from ethanol/ethyl acetate).

The 3'-(2,3-epoxy-propoxy)-acetanilide employed above can be prepared as follows:

100 g. of 3-acetamino-phenyl are introduced into a solution containing 32 g. of sodium hydroxide in 660 ml. of water and the resulting mixture is treated at once with 306 g. of epichlorohydrin. The mixture is intensively stirred at room temperature for 16 hours and subsequently extracted with chloroform. The 3'-(2,3-epoxy-propoxy)-acetanilide which remains after evaporation of the solvent from the organic phase melts at 70°–71°C. after recrystallization from ethyl acetate/isopropyl ether.

By the reaction of 2'-(2,3-epoxy-propoxy)-propionanilide and 4-(p-fluoro-phenyl)-1,2,3,6-tetrahydropyridine: rac-2'-{3-[4-(p-fluoro-phenyl)-3,6-dihydro-1(2H)-pyridyl]-2-hydroxy-propoxy}-propionanilide having a melting point of 187°–188°C. (from ethanol/ethyl acetate).

The 2'-(2,3-epoxy-propoxy)-propionanilide employed above can be prepared as follows:

87.5 g. of 2-propionamino-phenol are introduced into a solution containing 24 g. of sodium hydroxide in 500 ml. of water and the mixture is treated with 231.2 g. of epichlorohydrin. The mixture is intensively stirred at room temperature for 15 hours. The oil which separates out is extracted with chloroform. The 2'-(2,3-epoxy-propoxy)-propionanilide, which remains after evaporation of the solvent from the organic phase, melts at 74°–75°C., after recrystallization from ethyl acetate/petroleum ether.

By the reaction of 4'-(2,3-epoxy-propoxy)-acetanilide and 4-(p-chloro-phenyl)-4-hydroxy-piperidine: rac-4'-{3-[4-(p-chloro-phenyl)-4-hydroxy-piperidino]-2-hydroxy-propoxy}-acetanilide hydrochloride having a melting point of 236°C. (dec.) (from ethyl acetate/ether);

By the reaction of 4'-(2,3-epoxy-propoxy)-propionanilide and p-(fluoro-phenyl)-1,2,3,6-tetrahydropyridine: rac-4'-{3-[4-(p-fluorophenyl)-3,6-dihydro-1(2H)-pyridyl]-2-hydroxypropoxy}-propionanilide hydrochloride having a melting point of 211°–213°C. (from methanol/ethyl acetate).

The 4'-(2,3-epoxy-propoxy)-propionanilide employed above can be prepared in an analogous manner as described above for 2'-(2,3-epoxy-propoxy)-propionanilide and has a melting point of 117°–120°C. (from ethyl acetate/petroleum ether).

By the reaction of 4'-(2,3-epoxy-propoxy)-butyranilide and 4-(p-fluoro-phenyl)-1,2,3,6-tetrahydropyridine: rac-4'-{3-[4-(p-fluorophenyl)-3,6-dihydro-1(2H)-pyridyl]-2-hydroxypropoxy}-butyranilide hydrochloride having a melting point of 206°–208°C. (from methanol).

The 4'-(2,3-epoxy-propoxy)-butyranilide employed above can be prepared in an analogous manner as described above for 2'-(2,3-epoxy-propoxy)-propionanilide and has a melting point of 102°–103°C. (from ethyl acetate/petroleum ether).

By the reaction of 4'-(2,3-epoxy-propoxy)-isobutyranilide and 4-(p-fluoro-phenyl)-1,2,3,6-tetrahydropyridine: rac. 4'-{3-[4-(p-fluorophenyl)-3,6-dihydro-1(2H)-pyridyl]-2-hydroxypropoxy}-isobutyranilide hydrochloride having a melting point of 180°–182°C. (from methanol).

The 4'-(2,3-epoxy-propoxy)-isobutyranilide employed above can be manufactured in an analogous manner as described above, having a melting point of 125°–126°C. (from ethyl acetate/petroleum ether).

EXAMPLE 2

Preparation of rac-2'-{3-[4-(p-fluoro-phenyl)-3,6-dihydro-1(2H)-pyridyl]-2-hydroxy-propoxy}-N-methyl-acetanilide 4.4 g. of 2'-(2,3-epoxy-propoxy)-N-methyl-acetanilide and 3.6 g. of 4-(p-fluoro-phenyl)-1,2,3,6-tetrahydropyridine are heated under reflux conditions in 50 ml. of ethanol for 1 hour. The oily rac-2'-{3-[4-(p-fluoro-phenyl)-3,6-dihydro-1(2H)-pyridyl]-2-hydroxy-propoxy}-N-methyl-acetanilide which remains after evaporation of the solvent is chromatographed on a column of silica gel with ether and methanol as eluting agents. The conversion to the hydrochloride is effected in the usual manner by acidification of the solution in ethyl acetate with alcoholic hydrochloric acid up to the congo-acidic reaction. The rac-2'-{3-[4-(p-fluoro-phenyl)-3,6-dihydro-1(2H)-pyridyl]-2-hydroxypropoxy}-N-methyl-acetanilide hydrochloride melts at 157°–160°C.

The oily 2'-(2,3-epoxy-propoxy)-N-methyl-acetanilide employed above can be prepared in an analogous manner as described in Example 1, $n_D^{23}$ = 1.523.

EXAMPLE 3

Preparation of rac-p-{3-[4-(p-fluoro-phenyl)-3,6-dihydro-1(2H)pyridyl]-2-hydroxy-propoxy}-phenyl-urea 4.2 g. of [p-(2,3-epoxy-propoxy)-phenyl]-urea and 3.54 g. of 4-(p-fluoro-phenyl)-1,2,3,6-tetrahydropyridine are heated under reflux conditions in 40 ml. of ethanol for 1 hour. The rac-p-{3-[4-(p-fluoro-phenyl)-3,6-dihydro-1(2H)-pyridyl]-2-hydroxypropoxy}-phenyl-urea which separates out on cooling is removed by filtration under suction, dissolved in ethanol with slight warming and converted to the hydrochloride by addition of alcoholic hydrochloric acid up to a congo-acidic reaction. The rac-p-{3-[4-(p-fluoro-phenyl)-3,6-dihydro-1(2H)-pyridyl]-2-hydroxypropoxy}-phenyl-urea hydrochloride melts at 241°C. (from water).

In an analogous manner there is obtained:

By the reaction of [o-(2,3-epoxy-propoxy)-phenyl]-urea and 4-(p-fluoro-phenyl)-1,2,3,6-tetrahydropyridine: rac-[o-{3-[4-(p-fluoro-phenyl)-3,6-dihydro-1(2H)-pyridyl]-2-hydroxypropoxy}-phenyl]-urea hydrochloride having a melting point of 211°–213°C. (from methanol/water).

The [o-(2,3-epoxy-propoxy)-phenyl]-urea employed above can be prepared in an analogous manner as described above. The oily compound obtained can be further processed without further purification.

EXAMPLE 4

Preparation of rac-4'-{3-[4-(p-fluoro-phenyl)-3,6-dihydro-1(2H)-pyridyl]-2-hydroxy-propoxy}-benzanilide 5.4 g. of 4'-(2,3-epoxy-propoxy)-benzanilide and 3.5 g. of 4-(p-fluoro-phenyl)-1,2,3,6-tetrahydropyridine are heated under reflux conditions in 50 ml. of ethanol for 3 hours. The crystalline rac-4'-{3-[4-(p-fluoro-phenyl)-3,6-dihydro-1(2H)-pyridyl]-2-hydroxy-propoxy}-benzanilide obtained after cooling is converted in the usual manner to the hydrochloride, which melts at 222°–224°C. after recrystallization from ethanol.

The 4'-(2,3-epoxy-propoxy)-benzanilide employed above can be prepared as follows:

42.8 g. of p-hydroxy-benzanilide are introduced to a solution containing 9.6 g. of sodium hydroxide in 200 ml. of water and treated with stirring with 92.6 g. of epichlorohydrin. The mixture is stirred at room temperature for 16 hours. The 4'-(2,3-epoxy-propoxy)-benzanilide which separates out is washed with water, dissolved in chloroform and shaken with excess 3N caustic soda for 1 hour. The 4'-(2,3-epoxy-propoxy)-benzanilide isolated from the organic phase melts at 155°–156°C. after recrystallization from methanol.

EXAMPLE 5

Preparation of rac. 1-{3-[4-(p-fluoro-phenyl)-3,6-dihydro-1(2H)-pyridyl]-2-hydroxy-propoxy}-benzamide 1.9 g. of o-(2,3-epoxy-propoxy)-benzamide and 1.8 g. of 4-(p-fluoro-phenyl)-1,2,3,6-tetrahydropyridine are heated under reflux conditions in 20 ml. of ethanol for 1 hour. The rac.1-{3-[4-(p-fluoro-phenyl)-3,6-dihydro-1(2H)-pyridyl -2-hydroxy-propoxy}benzamide which separates out upon cooling is converted to the hydrochloride by treatment with alcoholic hydrochloric acid. The hydrochloride salt melts at 191°–193°C. after recrystallization from ethanol/ether.

In an analogous manner there is obtained:

By the reaction of p-(2,3-epoxy-propoxy)-benzamide and 4-(p-fluoro-phenyl)-1,2,3,6-tetrahydropyridine: rac.p-{3-[4-(p-fluorophenyl)-3,6-dihydro-1(2H)-pyridyl]-2-hydroxypropoxy}- benzamine hydrochloride having a melting point of 267°–269°C.

The p-(2,3-epoxy-propoxy)-benzamide employed above can be prepared as follows:

4.1 g. of p-hydroxybenzamide are added to a solution containing 1.45 g. of sodium hydroxide in 30 ml. of water and treated with 14 g. of epichlorohydrin. The reaction mixture is stirred at room temperature for 15 hours. The precipitated p-(2,3-epoxy-propoxy)-benzamide, after washing with water and recrystallization from methanol, has a melting point of 144°–146°C.

EXAMPLE 6

Preparation of rac-4'-{3-[4-(p-fluoro-phenyl)-3,6-dihydro-1(2H)pyridyl]-2-hydroxy-propoxy}-acetanilide 1.3 g. of 4'-(3-chloro-2-hydroxy-propoxy)-acetanilide, 0.9 g. of 4-(p-fluoro-phenyl)-1,2,3,6-tetrahydropyridine, 0.5 g. of sodium bicarbonate and a crystal of potassium iodide are added to a mixture containing 10 ml. of dimethylformamide and 20 ml. of tetrahydrofuran. The resulting mixture is heated at reflux for 24 hours. The reaction mixture, after cooling, is added to water and subsequently extracted with ethyl acetate. After removal of the solvent, the residual rac-4'-{3-[4-(p-fluorophenyl)-3,6-dihydro-1(2H)-pyridyl]-2-hydroxy-propoxy}-acetanilide, upon recrystallization from ethanol, has a melting point of 168°–169°C.

The 4'-(3-chloro-2-hydroxy-propoxy)-acetanilide employed above can be prepared as follows:

4.1 g. of 4'-(2,3-epoxy-propoxy)-acetanilide and 4.6 g. of pyridine hydrochloride are treated with 20 ml. of methanol and heated under reflux conditions for 1 hour. The solvent is evaporated under reduced pressure. The residue is dissolved in n-butanol. The butanol extract is once again washed with water, then dried and evaporated. The residual 4'-(3-chloro-2-hydroxy-propoxy)-acetanilide, after recrystallization from ethyl acetate, has a melting point of 106°–108°C.

EXAMPLE 7

Preparation of 4'-{3-[4-(p-chloro-phenyl)-3,6-dihydro-1(2H)pyridyl]-propoxy}-acetanilide 2.7 g. of 4'-(3-bromo-propoxy)-acetanilide, 1.9 g. of 4-(p-chloro-phenyl)-1,2,3,6-tetrahydropyridine, 0.7 g. of potassium carbonate and a few crystals of potassium iodide are heated under reflux conditions in 20 ml. of ethanol for 24 hours. While hot, the mixture is filtered. The crystalline 4'-{3-[4-(p-chloro-phenyl)-3,6-dihydro-1(2H)-pyridyl]-propoxy}-acetanilide which precipitates on cooling is dissolved in methanol and converted to the hydrochloride by addition of alcoholic hydrochloric acid up to the congo-acidic reaction, which crystallizes after the addition of ethyl acetate. The hydrochloride melts at 260°–264°C. after recrystallization from methanol/ethyl acetate.

In an analogous manner there is obtained:
By the reaction of 4'-(3-bromo-propoxy)-acetanilide and 4-(p-fluoro-phenyl)-1,2,3,6-tetrahydropyridine: 4'-{3-[4-(p-fluoro-phenyl)-3,6-dihydro-1(2H)-pyridyl]-propoxy}-acetanilide having a melting point of 172°–173°C. (from methanol);

By the reaction of 4'-(3-bromo-propoxy)-propionanilide and 4-(p-fluoro-phenyl)-1,2,3,6-tetrahydropyridine: 4'-{3-[4-(p-fluoro-phenyl)-3,6-dihydro-1(2H)-pyridyl]-propoxy}-propionanilide, having a melting point of 173°–175°C. (from methanol);

By the reaction of 4'-(3-bromo-propoxy)-acetanilide and 4-hydroxy-4-(p-fluoro-phenyl)-piperidine: 4'-{3-[4-(p-chloro-phenyl)-4-hydroxy-piperidino]-propoxy}-acetanilide, having a melting point of 229–230°C. (from methanol).

EXAMPLE 8

Preparation of rac-4'-[{3-[4-(p-fluoro-phenyl)-3,6-dihydro-1(2H)-pyridyl]-2-hydroxy-propyl}-thio]-acetanilide hydrochloride 4.5 g. of 4'-(2,3-epoxy-propoxy)-thio-acetanilide and 3.6 g. of 4-(p-fluoro-phenyl)-1,2,3,6-tetrahydropyridine are heated under reflux conditions in 30 ml. of ethanol for 1 hour. Approximately two-thirds of the solvent is removed by distillation under reduced pressure. The residual solution is acidified with alcoholic hydrochloric acid and crystallized with ethyl acetate to yield rac-4'-[{3-[4-(p-fluoro-phenyl)-3,6-dihydro-1(2H)-pyridyl]-2-hydroxy-propyl}-thio]-acetanilide hydrochloride which melts at 214°–218°C. after recrystallization from methanol/ethyl acetate.

The 4'-[(2,3-epoxy-propyl)-thio]-acetanilide employed above can be prepared as follows:

33.4 g. of p-acetaminothiophenol are introduced into a solution containing 8.8 g. of sodium hydroxide in 200 ml. of water and treated with 27.6 g. of epichlorohydrin with stirring. The reaction proceeds exothermically and is controlled by cooling. The reaction mixture is stirred at room temperature for 12 hours. The 4'-(2,3-epoxy-propyl)-thio-acetanilide which precipitates is washed with water and recrystallized from ethyl acetate/cyclohexane and melts at 82°C.

EXAMPLE 9

Preparation of rac-p-[{3-[4-(p-fluoro-phenyl)-3,6-dihydro-1(2H)-pyridyl]-2-hydroxy-propyl}-thio]-chlorobenzene 4.3 g. of 1-[(p-chloro-phenyl)-thio]-2,3-epoxy-propane and 3.8 g. of 4-(p-fluoro-phenyl)-1,2,3,6-tetrahydropyridine are heated under reflux conditions in 30 ml. of ethanol for 3 hours. The crystalline rac-p-[{3-[4-(p-fluoro-phenyl)-3,6-dihydro-1(2H)-pyridyl]-2-hydroxy-propyl}-thio]-chlorobenzene which precipitates on cooling is recrystallized from methanol and converted to the hydrochloride by addition of alcoholic hydrochloric acid. The hydrochloride salt has a melting point of 178°–179°C.

In an analogous manner there is obtained:
By the reaction of 1-(p-tolyl-thio)-2,3-epoxy-propane and 4-(p-fluoro-phenyl)-1,2,3,6-tetrahydropyridine: rac-p-[{3-[4-(p-fluoro-phenyl)-3,6-dihydro-1(2H)-pyridyl]-2-hydroxy-propyl}-thio]-toluene hydrochloride having a melting point of 174°–175°C. (from ethanol);

By the reaction of 1-[(p-methoxy-phenyl)-thio]-2,3-epoxy-propane and 4-(p-fluoro-phenyl)-1,2,3,6-tetrahydropyridine: rac-p-{3-[4-(p-fluoro-phenyl)-3,6-dihydro-1(2H)-pyridyl]-2-hydroxy-propyl}-thio-anisole.

EXAMPLE 10

Preparation of 4'-[{3-[4-(p-fluoro-phenyl)-3,6-dihydro-1(2H)pyridyl]-propyl}-thio]-acetanilide 11.7 g. of 4'-[(3-bromo-propyl)-thio]-acetanilide, 5.4 g. of 4-(p-fluoro-phenyl)-1,2,3,6-tetrahydropyridine, 5 g. of potassium carbonate, 0.1 g. of potassium iodide are heated under reflux conditions in 95 ml. of ethanol and 5 ml. of water for 24 hours. The reaction mixture is filtered hot. The 4'-[{3-[4-(p-fluoro-phenyl)-3,6-dihydro-1(2H)-pyridyl]-propyl}-thio]-acetanilide which separates out upon cooling melts at 165°–166°C. after recrystallization from methanol.

The 4'-[(3-bromo-propyl)-thio]-acetanilide employed above can be prepared as follows:

16.7 g. of 4-acetamino-thiophenol, 60 ml. of ethanol, 8 g. of 50 percent aqueous caustic soda and 156 g. of 1,3-dibromopropane are heated under reflux conditions for 3 hours. The excess 1,3-dibromo-propane is removed by steam distillation. The oil which separates out is taken up in chloroform. The resulting organic phase is washed neutral twice with 1N caustic soda and with water. The oily 4'-[(3-bromo-propyl)-thio]-acetanilide which remains after evaporation of the solvent under reduced pressure is chromatographed on a column of neutral aluminum oxide (activity grade 1) with benzene as the eluting agent. After recrystallization from dilute ethanol, 4'-[(3-bromo-propyl)-thio]-acetanilide melts at 85°C.

In an analogous manner there is obtained:

By the reaction of 4'-[(3-bromo-propoxy)-thio]-acetanilide and 4-hydroxy-4-(p-chlorophenyl)piperidine: 4'-[{3-[4-(p-chloro-phenyl)-4-hydroxy-piperidine]-propyl}-thio]-acetanilide having a melting point of 205°–206°C. (from methanol).

EXAMPLE 11

Preparation of rac-2'-{3-[4-(p-fluoro-phenyl)-3,6-dihydro-1(2H)-pyridyl]-2-hydroxy-propoxy}-propionanilide hydrochloride 0.8 g. of o-hydroxy-propionanilide are introduced to a solution containing 120 mg. of sodium in 20 ml. of methanol and thereafter 1.3 g. of 4-(p-fluoro-phenyl)-1-(3-chloro-2-hydroxy-propyl)-1,2,3,6-tetrahydropyridine are added. The mixture is heated under reflux conditions for 24 hours, filtered and the solvent evaporated under reduced pressure. The residue is dissolved in ethyl acetate and converted to the hydrochloride by the addition of alcoholic hydrochloric acid up to the congoacidic reaction. The rac-2'-{3-[4-(p-fluoro-phenyl)-3,6-dihydro1(2H)-pyridyl]-2-hydroxy-propoxy}-propionanilide hydrochloride which forms melts at 187°–188°C. after recrystallization from ethanol/ethyl acetate.

The 4-p-fluoro-phenyl-1-(3-chloro-2-hydroxy-propyl)-1,2,3,6-tetrahydropyridine employed above can be prepared as follows:

7.6 g. of 4-p-fluoro-phenyl-1,2,3,6-tetrahydropyridine, 2 drops of piperidine and 40 ml. of absolute ether are cooled to 0°C. and treated over a period of 30 minutes with 3.7 g. of epichlorohydrin in 10 ml. of absolute ethyl ether. The mixture is left to stand at room temperature for 24 hours and at about 0°C. for 60 hours. Thereafter, the solution is filtered and evaporated under reduced pressure. The residual oil is taken up in benzene and chromatographed on a column of Kieselgel with benzene/ether 4:1 as eluting agent. The 4-(p-fluoro-phenyl)-1-(3-chloro-2-hydroxy-propyl)-1,2,3,6-tetrahydropyridine obtained from the eluate on evaporation, after recrystallization from diethyl ether/petroleum ether, has a melting point of 83°–85°C.

EXAMPLE 12

Preparation of rac-p-{3-[4-(p-fluoro-phenyl)-3,6-dihydro-1(2H)-pyridyl]-2-hydroxy-propoxy}-aniline 0.75 g. of rac-p-{3-[4-(p-fluoro-phenyl)-3,6-dihydro-1(2H)-pyridyl]-2-hydroxy-propoxy }-nitrobenzene are added to 50 ml. of ethanol. The suspension is heated to 50°C. and, after the addition of 0.5 g. of hydrazine hydrate, is treated portionwise with 0.1 g. of ethanol moistened palladium on carbon (5 percent). The mixture, after the uptake of the required hydrogen is heated under reflux conditions for 1 hour and subsequently filtered. The hot filtrate is concentrated under reduced pressure to begin the crystallization. The precipitated rac-p-{3-[4-(p-fluoro-phenyl)-3,6-dihydro-1(2H)-pyridyl]-2-hydroxypropoxy } -aniline, after recrystallization from ethanol, has a melting point of 146°–147°C.

The rac-p-{3-[4-(p-fluoro-phenyl)-3,6-dihydro-1(2H)-pyridyl]-2-hydroxy-propoxy}-nitrobenzene, employed above, can be prepared in an analogous manner to that described in Example 1, from p-(2,3-epoxy-propoxy)-nitrobenzene and 4-(p-fluoro-phenyl)-1,2,3,6-tetrahydropyridine. The compound, after recrystallization from methanol, has a melting point of 144°–145°C.

EXAMPLE 13

Preparation of rac-4'-{3-[4-(p-fluoro-phenyl)-3,6-dihydro-1(2H)-pyridyl]-2-hydroxy-propoxy}-aniline dihydrochloride 3.85 g. of rac-4'-{3-[4-(p-fluoro-phenyl)-3,6-dihydro-1(2H)-pyridyl]-2-hydroxy-propoxy}-acetanilide hydrochloride and 20 ml. of about 20 percent hydrochloric acid are heated under reflux conditions for 2 hours. The resulting solution is evaporated under reduced pressure. The residual rac-4'-{3-[4-(p-fluoro-phenyl)-3,6-dihydro-1(2H)-pyridyl]-2-hydroxy-propoxy}-aniline dihydrochloride melts at 238°–242°C. (dec.) after two recrystallizations from dioxane/ethyl acetate.

In an analogous manner there is obtained:

By the reaction of rac-2'-{3-[4-(p-fluorophenyl)-3,6-dihydro-1(2H)-pyridyl]-2-hydroxy-propoxy}-N-methyl-acetanilide hydrochloride: rac-2'-{3-[4-(p-fluoro-phenyl)-3,6-dihydro-1(2H)-pyridyl]-2-hydroxy-propoxy } -N-methylaniline dihydrochloride having a melting point of 262°–264°C. (from methanol);

By the reaction of 4'-{3-(4-(p-fluoro-phenyl)-3,6-dihydro-1(2H)-pyridyl]-propoxy } -acetanilide: 4'-{3-[4-(p-fluoro-phenyl)-3,6-dihydro-1(2H)-pyridyl]-propoxy}-aniline hydrochloride, the free base of which melts at 102°–104°C. (from methanol);

By the reaction of rac-4'-[{3-[4-(p-fluorophenyl)-3,6-dihydro-1(2H)-pyridyl]-2-hydroxpropyl}-thio]-acetanilide hydrochloride: rac-4'-[{3-[4-(p-fluoro-phenyl)-3,6-dihydro-1(2H)-pyridyl]-2-hydroxy-propyl}-thio]-aniline dihydrochloride, the free base of which melts at 140°–142°C. (from benzene/cyclohexane);

By the reaction of 4'-[{3-[4-(p-fluoro-phenyl)-3,6-dihydro-1(2H)-pyridyl]-propyl}-thio]-acetanilide: 4'-[{3-[4-(p-fluoro-phenyl)-3,6-dihydro-1(2H)- pyridyl]-propyl } -thio]-aniline dihydrochloride having a melting point of 228°–231°C. (from methanol/ethyl acetate).

EXAMPLE 14

Preparation of rac-4'-{3-[4-(p-fluoro-phenyl)-3,6-dihydro-1(2H)-pyridyl]-2-hydroxy-propoxy}-methanesulfonanilide 1.8 g. of rac-4'-{3-[4-(p-fluoro-phenyl)-3,6-dihydro-1(2H)-pyridyl]-2-hydroxy-propoxy } -aniline are dissolved in a mixture comprising 10 ml. of absolute benzene, 10 ml. of chloroform and 5 ml. of absolute pyridine with mild heating and treated dropwise with stirring at 0°–5°C. with a solution containing methanesulfonic acid chloride in 2 ml. of absolute benzene. The reaction mixture is left to stand at room temperature for 16 hours and thereupon, after the addition of 20 ml. of chloroform, poured into water. The oily rac-4'-{3-[4-(p-fluoro-phenyl)-3,6-dihydro-1(2H)-pyridyl]-2-hydroxy-propoxy } -methanesulfonanilide obtained from the organic phase can be crystallized by trituration with dilute methanol. The rac-4'-{3-[4-(p-fluorophenyl)-3,6-dihydro-1(2H)-pyridyl]-2-hydroxy-propoxy}-methanesulfonanilide melts at 171°C. after recrystallization from dilute methanol.

In an analogous manner there is obtained:

By the reaction of rac-4'-[{3-[4-(p-fluorophenyl)-3,6-dihydro-1(2H)-pyridyl]-2-hydroxypropyl}-thio]-aniline: rac-4'-[ {3-[4-(p-fluorophenyl)-3,6-dihydro-1(2H)-pyridyl]-2-hydroxypropyl}-thio]-methanesulfonanilide, which has a melting point of 152°C. (from dilute methanol);

By the reaction of 4-(p-fluoro-phenyl)-1-[3-(p-amino-phenoxy)-propyl]-1,2,3,6-tetrahydropyridine: 4'-{3-[4-(p-fluoro-phenyl)-3,6-dihydro-1(2H)-pyridyl]-propoxy}-methanesulfonanilide having a melting point of 147°–148°C. (from methanol);

By the reaction of 4-(p-fluoro-phenyl)-1-{3-[(1-amino-phenyl)-thio]-propyl}-1,2,3,6tetrahydropyridine: 4'-[{3-[4-(p-fluoro-phenyl)3,6-dihydro-1(2H)-pyridyl]-propyl}-thio]-methanesulfonanilide having a melting point of 139°–141°C. (from methanol/water).

EXAMPLE 15

Preparation of rac-4'-{3-[4-(p-fluoro-phenyl)-3,6-dihydro-1(2H)-pyridyl]-2-hydroxy-propoxy}-acetanilide 1.7 g. of rac-p-{3-[4-(p-fluoro-phenyl)-3,6-dihydro-1(2H)-pyridyl]-hydroxy-propoxy } -aniline are dissolved in 20 ml. of 3N acetic acid solution. The solution is treated with 1 g. of acetic anhydride and after standing at room temperature for 12 hours, evaporated under reduced pressure. The residue is dissolved in chloroform. The chloroform extract is again washed with 1N sodium hydroxide solution, dried and evaporated. The residual rac-4'-{3-[4-(p-fluoro-phenyl)-3,6-dihydro-1(2H)-pyridyl]-2-hydroxy-propoxy}-acetanilide, after recrystallization from ethanol, melts at 168°C.

EXAMPLE 16

Preparation of rac-4'-{3-[4-(p-fluoro-phenyl)-3,6-dihydro-1(2H)-pyridyl]-2-acetoxy-propoxy}-acetanilide hydrochloride 3 g. of rac-4'-{3-[4-(p-fluoro-phenyl)-3,6-dihydro-1(2H)-pyridyl]-2-hydroxy-propoxy } -acetanilide are dissolved in 21 ml. of dimethylsulfoxide, treated with 14 ml. of acetic anhydride and allowed to stand at room temperature for 20 hours. The solution is poured onto water, whereby the product separates out. The product is converted to the hydrochloride by dissolving it in ethyl acetate and adding alcoholic hydrochloric acid up to congo-acidic reaction. The rac-4'-{3-[4-(p-fluoro-phenyl)-3,6-dihydro-1(2H)-pyridyl]-2-acetoxy-propoxy}-acetanilide hydrochloride which is formed melts at 222°–230°C. after recrystallization from methanol/ether.

In an analogous manner there is obtained:

By the reaction of rac-4'-{3-[4-(p-fluorophenyl)-3,6-dihydro-1(2H)-pyridyl]-2-hydroxypropoxy}-propionanilide: rac-4'-{3-[4-(p-fluoro-phenyl)-3,6-dihydro-1(2H)-pyridyl]-2-acetoxy-propoxy}-propionanilide hydrochloride.

EXAMPLE 17

Preparation of rac-4'-{3-[4-(p-fluoro-phenyl)-piperidino]-2-hydroxy-propoxy}-propionanilide hydrochloride A solution containing 3.8 g. of rac-4'-{3-[4-(p-fluorophenyl)-3,6-dihydro-1(2H)-pyridyl]-2-hydroxypropoxy}-propionanilide hydrochloride in 250 ml. of 95 percent alcohol and 20 ml. of water are treated with 100 mg. of platinum oxide and hydrogenated at room temperature. The hydrogenation is discontinued upon the uptake of 1 molecular equivalent of hydrogen. The catalyst is removed by filtration, and the solution is evaporated under reduced pressure. The residual rac-4'-{3-[4-(p-fluoro-phenyl)-piperidino]-2-hydroxy-propoxy}-propionanilide hydrochloride, after recrystallization from methanol/ethyl acetate, has a melting point of 207°–210°C.

EXAMPLE 18

Preparation of rac-4'-{3-[4-(p-fluoro-phenyl)-3,6-dihydro-1(2H)-pyridyl]-2-acetoxy-propoxy}-acetanilide hydrochloride 1.7 g. of rac-p-{3-[4-(p-fluoro-phenyl)-3,6-dihydro-1(2H)-pyridyl]-2-hydroxy-propoxy } -aniline are dissolved in 10 ml. of dimethylsulfoxide, treated with 7.5 ml. of acetic anhydride and allowed to stand at room temperature for 20 hours. The reaction mixture is thereafter added to water whereby the product precipitates. This is then dissolved in ethyl acetate and converted to its hydrochloride by the addition of alcoholic hydrochloric acid to a congo-acidic reaction point. The rac4'-{3-[4-(p-fluoro-phenyl)-3,6-dihydro-1(2H)-pyridyl]-2-acetoxypropoxy}-acetanilide hydrochloride, after recrystallization from methanol/ether, has a melting point of 225°–230°C.

EXAMPLE 19

Preparation of (−) 4'-{3-[4-(p-fluoro-phenyl)-3,6-dihydro-1(2H)pyridyl]-2-hydroxy-propoxy}-isobutyranilide hydrochloride and (+) 4'-{3-[4-(p-fluoro-phenyl)-3,6-dihydro-1(2H)-pyridyl]-2-hydroxy-propoxy}-isobutyranilide hydrochloride 1.03 g. of rac-4'-{3-[4-(p-fluoro-phenyl)-3,6-dihydro-1(2H)-pyridyl]-2-hydroxy-propoxy}-isobutyranilide and 0.45 g. of (+) 0,0-dibenzoyltartrate are dissolved in 10 ml. of hot methanol. The solution is treated at boiling with 0.5 ml. of water and thereafter filtered. Upon cooling, the (+) 4'-{3-[4-(p-fluorophenyl)-3,6-dihydro-1(2H)-pyridyl]-2-hydroxy-propoxy}-isobutyranilide semi-dibenzoyltartrate is precipitated in the crystalline. The (−) rotating salt remains in solution and can be isolated therefrom. The (+) rotating salt, after recrystallization from 10 ml. of methanol, has a melting point of 164°–165°C., $[\alpha]_{436}^{20}=+31.0$ (in dimethylsulfoxide, C=1). The (+) rotating salt is shaken with 10 ml. of sodium hydroxide and 10 ml. of chloroform. The base resulting from the organic phase, after recrystallization from ethanol, has a melting point of 183°–184°C., $[\alpha]_D^{20}= +2.2°$ (in ethanol, C=1). To prepare the hydrochloride, the base is suspended in 5 ml. of ethanol and treated with alcoholic hydrochloric acid until a congo-acidic reaction, whereby all of the material is dissolved. The (−) 4'-{3-[4-(p-fluoro-phenyl)-3,6-dihydro-1(2H)-pyridyl]-2-hydroxy-propoxy}-isobutyranilide hydrochloride has a melting point of 186°C., $[\alpha]_{436}^{20} = -12.1°$ (in ethanol, c=1).

The (+) rotating hydrochloride can be prepared in a like manner by the reaction of rac-4'-{3-[4(p-fluorophenyl)-3,6-dihydro-1(2H)-pyridyl]-2-hydroxy-propoxy}-isobutyranilide with (−) 0,0-dibenzoyltartrate.

EXAMPLE 20

Tablets are prepared of the following composition:

| | Per Tablet |
|---|---|
| rac-2'-{3-[4-(p-fluoro-phenyl)-3,6-dihydro-1(2H)-pyridyl]-2-hydroxy-propoxy}-propionanilide hydrochloride | 10 mg. |
| Lactose | 63 mg. |
| Corn starch | 74 mg. |
| Talcum | 2.7 mg. |
| Magnesium stearate | 0.3 mg. |
| | 150 mg. |

The rac-2'-{3-[4-(p-fluoro-phenyl)-3,6-dihydro-1(2H)-pyridyl]-2-hydroxy-propoxy}-propionanilide hydrochloride is mixed with the lactose and the corn starch and granulated with the aid of ethanol. The granulate is dried, mixed with talcum and pressed into tablets.

| | |
|---|---|
| Individual weight of one tablet | 150 mg. |
| Active substance content of one tablet | 10 mg. |

We claim:
1. A compound of the formula

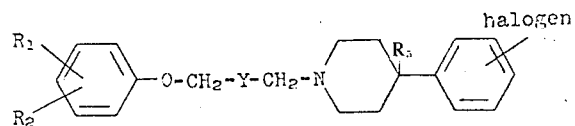

wherein $R_1$ is hydrogen, amino, mono-(lower alkyl)-amino, lower alkanoyl amido, p-chlorobenzoylamide, N- lower alkyl-lower alkanoyl-amido, lower alkyl sulfonyl-amido, carbamoyl or ureido; $R_2$ is hydrogen, halogen, lower alkyl or lower alkoxy; $R_5$ is hydrogen or hydroxy; and Y is methylene, hydroxymethylene, lower alkanoyloxymethylene, lower alkyl sulfonyl oxymethylene, phenyl sulfonyl oxymethylene, lower alkyl-phenyl sulfonyloxy methylene or carbonyl, or a pharmaceutically acceptable acid addition salt thereof.

2. A compound in accordance with claim 1, racemic-2'-{3-[4-(p-fluoro-phenyl)-4-hydroxy-piperidino]-2-hydroxy-propoxy}-acetanilide.

3. A compound in accordance with claim 1, racemic-2'-{3-[4-(p-chloro-phenyl)-piperidino]-2-hydroxy-propoxy}-acetanilide.

4. A compound in accordance with claim 1, racemic-4'-{3-[4-(p-chloro-phenyl)-4-hydroxy-piperidino]-2-hydroxypropoxy}-acetanilide.

5. A compound in accordance with claim 1, racemic-4'-{3-[4-(p-fluoro-phenyl)-piperidino]-2-hydroxy-propoxy}-propionanilide.

* * * * *

UNITED STATES PATENT OFFICE
CERTIFICATE OF CORRECTION

PATENT NO. : 3,862,158
DATED : January 21, 1975
INVENTOR(S) : Albrecht Edenhofer and Hans Spiegelberg It is certified that error appears in the above-identified patent and that said Letters Patent are hereby corrected as shown below:

Column 18, claim 1, line 20, "p-chlorobenzoylamide," should be:

p-chlorobenzoylamido,

Signed and sealed this 29th day of April 1975.

(SEAL)
Attest:

RUTH C. MASON
Attesting Officer

C. MARSHALL DANN
Commissioner of Patents
and Trademarks